(12) United States Patent
Joki

(10) Patent No.: US 6,502,996 B2
(45) Date of Patent: Jan. 7, 2003

(54) BEARING WITH LOW WEAR AND LOW POWER LOSS CHARACTERISTICS

(75) Inventor: Mark A. Joki, Dover, OH (US)

(73) Assignee: The Timken Company, Canton, OH (US)

( * ) Notice: Subject to any disclaimer, the term of this patent is extended or adjusted under 35 U.S.C. 154(b) by 14 days.

(21) Appl. No.: 09/853,529

(22) Filed: May 11, 2001

(65) Prior Publication Data
US 2002/0168127 A1 Nov. 14, 2002

(51) Int. Cl.$^7$ ............................................. F16C 33/36
(52) U.S. Cl. .................... 384/571; 384/450; 384/568
(58) Field of Search ................................ 384/568, 565, 384/564, 569, 571, 450

(56) References Cited

U.S. PATENT DOCUMENTS

| | | | |
|---|---|---|---|
| 1,992,682 A | * 2/1935 | Walters | |
| 4,877,340 A | 10/1989 | Hoeprich | ..................... 384/571 |
| 5,007,747 A | * 4/1991 | Takeuchi et al. | ............. 384/450 |
| 5,711,738 A | 1/1998 | Abe et al. | .................... 475/246 |
| 5,890,815 A | 4/1999 | Ijuin et al. | |
| 6,033,123 A | * 3/2000 | Sato et al. | ................... 384/571 |
| 6,086,262 A | 7/2000 | Matsumoto | |
| 6,328,477 B1 | 12/2001 | Tsujimoto | |
| 6,379,049 B1 | * 4/2002 | Shibazaki et al. | .......... 384/450 |
| 2001/0012420 A1 | 8/2001 | Unno et al. | |

FOREIGN PATENT DOCUMENTS

| | | | |
|---|---|---|---|
| DE | 505357 C | 8/1930 | |
| FR | 862103 A | 2/1941 | |

OTHER PUBLICATIONS

Patent Abstracts of Japan, vol. 1999, No. 12 Oct. 29, 1999 & JP 11201151 A (NTN Corp), Jul. 27, 1999 abstract.

* cited by examiner

Primary Examiner—Thomas R. Hannon
(74) Attorney, Agent, or Firm—Polster, Lieder, Woodruff & Lucchesi, L.C.

(57) ABSTRACT

A tapered roller bearing that is well-suited for supporting a pinion in an automotive differential has a cone and a cup provided with opposed raceways that are crowned. The cone also has a thrust rib provided with a rib face at the large end of its raceway. In addition, the bearing has tapered rollers, each having a tapered side face that is crowned and a large end that is spherical. The rollers contact the raceways along their crowned side faces and the rib face along their spherical end faces. The roller length to large end diameter is less than 1.5. The crowning on the raceway, together with the crowning of the roller side face provide total end relief ranging between 700 $\mu$in. and 1500 $\mu$in. per inch. The centers of contact between the side faces and raceways are offset toward the rib face. The height of the rib face amounts to 30%–45% of the diameter of the large ends of the rollers. The radius of the spherical large end face for a roller exceeds 90% of the roller apex length. The runout in the large end faces is less than 50 $\mu$in. and the center of contact between the end face of each roller and the rib face is between 0.02 and 0.04 in. All of this contributes to low torque demands by the bearing itself and low wear.

24 Claims, 3 Drawing Sheets

BEARING WITH LOW WEAR AND LOW POWER LOSS CHARACTERISTICS

BACKGROUND OF THE INVENTION

This invention relates in general to tapered roller bearings and, more particularly, to a tapered roller bearing that is characterized by low wear and low power loss.

The gearing in an automotive differential must operate with considerable precision to keep noise and wear at a minimum. Typically, that gearing includes a ring gear and a pinion both of which rotate in a differential housing. The pinion meshes with ring gear to transfer torque from a drive shaft to the ring gear which in turn transfers the torque to axle shafts that extend from the housing. Both gears have spiral teeth, that is to say they are hypoid gears.

The pinion must rotate with considerable stability, that is to say, about a fixed axis and in a fixed axial position. To this end, the pinion is carried on a shaft that rotates in a pair of tapered roller bearings that are fitted to the differential housing where they are mounted in opposition and set to a condition of preload. While the arrangement gives the stability required—at least at the outset—the tapered roller bearings in current use require a measure of torque to overcome friction within the bearings themselves as well as the churning of the lubricant within them. This torque consumes power. Moreover, the bearings in time experience wear, and this detracts from the stability, so that the pinion may migrate from the position that provides the most effective engagement with the ring gear.

Several factors affect the torque required by a tapered roller bearing and the wear that the bearing experiences. For example, small angles on the raceway cause the rollers to fit tightly between the raceways under the preload, thus increasing the friction in the bearing and wear as well. When the rollers are long in comparison to their width, the longer lines of contact with the raceways result in significant churning of the lubricant film which separates the rollers from the raceways, and this requires torque. Typically, the rollers are slightly crowned to prevent excessive edge-loading, but even so, between the ends the crowning diminishes considerably, and here the churning occurs along the lines of contact. The typical tapered roller bearing has a thrust rib at the large diameter end of the raceway on its inner race or cone, and the rib prevents the rollers from moving up the raceway and being expelled. Normally the height of the rib amounts to about 20% of the diameter of the rollers at their large ends. This concentrates the contact forces in relatively small areas, and accelerates wear. A rough surface finish on the rib and roller ends leaves asperities that penetrate the protective film created by the lubricant, thus creating higher friction. The large end faces on the rollers are slightly radiused to provide a desirable contact area, but when the crown becomes too pronounced, it serves to further concentrate the axial forces between the rollers and rib in an area that is too small. Pronounced runout in the large end face of a roller will destabilize the oil film between the end face and the thrust rib and contribute to higher torque. Typically, the roller end faces contact the thrust rib relatively far from the large end of the cone raceway, and this creates a relatively large moment arm between the point of contact and the raceway. The large moment arm demands a relatively high torque to rotate the roller about its axis, and this translates into torque required to rotate the cone of the bearing. Finally the typical bearing, owing to the crown on the rollers, has the center of contact between the rollers and the raceways generally located midway between the ends of the rollers. Thus, a relatively large moment arm exits between the contact at the large end of the roller and the center of contact along the raceways. The contact force acting along this moment arm tends to skew the rollers, and that in turn increases the torque in the bearing.

SUMMARY OF THE INVENTION

The present invention resides in a tapered roller bearing having races provided with opposed raceways, a thrust rib having a rib face at the large end of the raceway on one of the races, and tapered rollers between the races and having side faces along which they contact the raceways and large end faces along which they contact the rib face. The raceways, the rib face, the side and large end faces of the rollers, as well as the rollers themselves are all configured such that the bearing reduces churning of the hydrodynamic oil film within it to a minimum, demands little torque, and experiences minimal wear. The invention also resides in an automotive differential having a pinion supported on such a bearing.

DETAILED DESCRIPTION OF INVENTION

Figure 1:
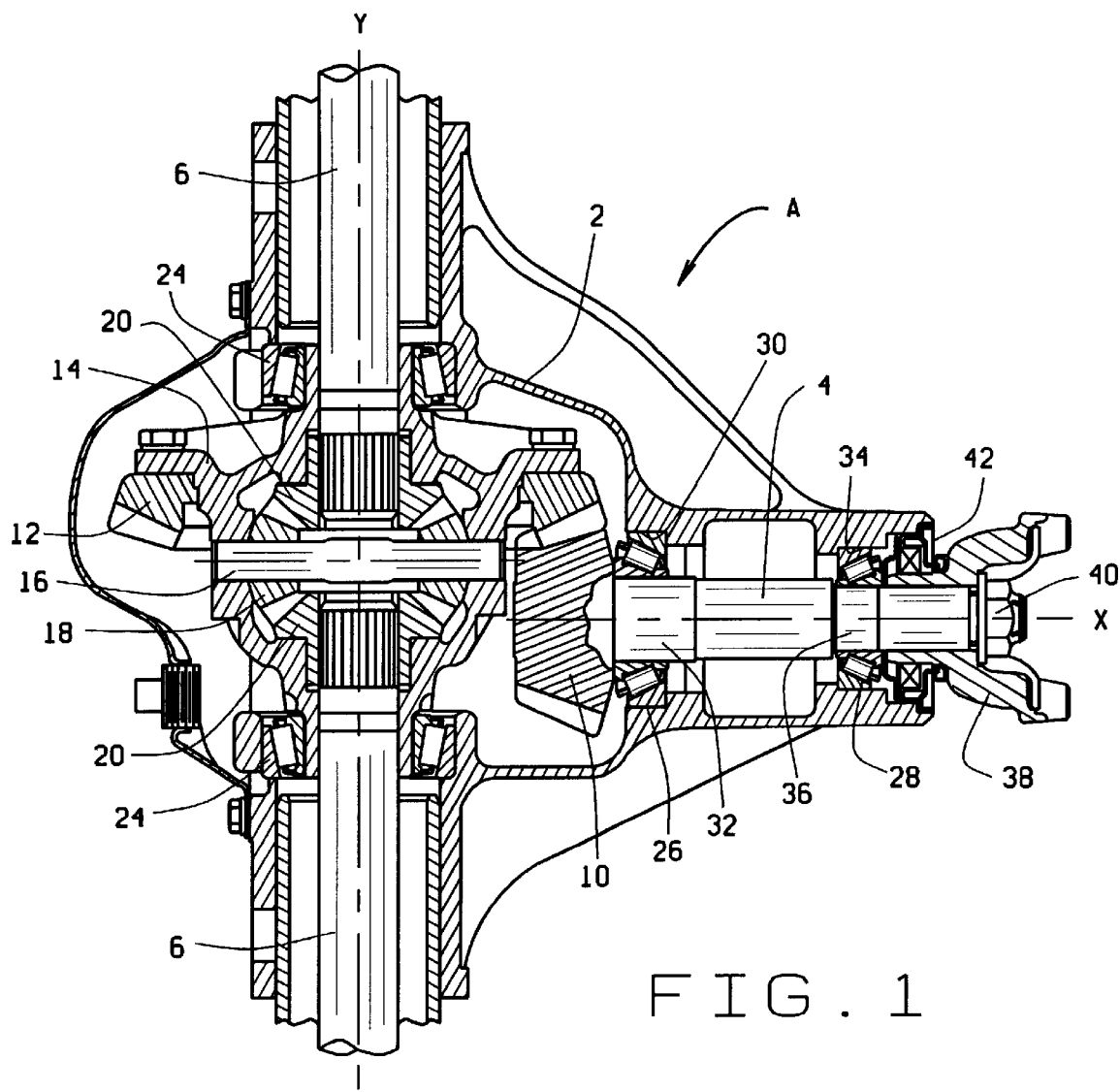
FIG. 1 is a sectional view of an automotive differential having a pinion shaft mounted on bearings constructed in accordance with and embodying the present invention.

Referring now to the drawings, a differential. A (FIG. 1) for an automotive vehicle includes a housing 2 within which a pinion shaft 4 and two axle shafts 6 rotate, the former about an axis X and the latter about an axis Y that extends transversely with respect to the axis X, but is located above it. The pinion shaft 4 carries a pinion 10 which meshes with a ring gear 12 on a carrier 14 through which a cross shaft 16 extends. The cross shaft 16 carries bevel gears 18 which mesh with more bevel gears 20 on the axle shafts 6. Thus, when the ring gear 12 and its carrier 14 rotate, the side shafts 6 turn. The carrier 14 rotates on two tapered roller bearings 24 that are fitted to the housing 2 in the direct configuration, that is with their large ends presented. toward each other. The pinion shaft 4, on the other hand, rotates in tapered roller bearings 26 and 28 that are fitted to the housing 2 in the indirect configuration, that is with their small ends presented toward each other. The bearing 26 occupies the head position closest to the pinion 10, whereas the bearing 28 occupies the tail position more remote from the pinion 10. The two bearings 26 and 28 fit snugly around the pinion shaft 4 and snugly into the housing 2 and are furthermore set to a condition of preload. As a consequence, the axis X remains fixed with respect to the housing 2, and the pinion 10, while being able to rotate with the shaft 4 about the axis X, cannot be displaced radially or axially with respect to the housing 2.

Actually, the housing 2 contains (FIG. 1) a counterbore 30, whereas the pinion shaft 4 adjacent to the back face of the pinion 10 has a bearing seat 32. The head bearing 26 fits into the counterbore 30 and around the seat 32. The housing 2 also has a counterbore 34 which opens out of the housing 2 toward the exterior, while the shaft 4 has another bearing seat 36 which is located in the counterbore 34. The tail bearing 28 fits into the counterbore 34 and around the bearing seat 36. The pinion shaft 10 projects out of the housing 2 where it is fitted with a universal joint 38 that is retained on the shaft 4 with a nut 40 that is threaded over the end of the shaft 4. The bearing seat 30 leads up to the pinion 10, whereas the seat 34 leads,up to the end of the universal joint 38. Beyond the tail bearing 28, the housing 2 is fitted with a seal 42 which establishes a dynamic fluid barrier around the universal joint 40.

The head bearing 26 includes (FIG. 2) a cone 44, which is fitted over the bearing seat 32 with an interference fit, and a cup 46 which fits into the counterbore 30 and surrounds the cone 44. In addition the bearing 26 has tapered rollers 48 arranged in a single row between the cone 44 and the cup 46, and a cage 50 that fits between the cone 44 and cup 46 and receives the rollers 48 to maintain the proper spacing between adjacent rollers 48. The cone 44 constitutes the inner race of the bearing 26, whereas the cup 46 constitutes the outer race 46.

Turning now to the cone 44, it includes (FIGS. 2) a tapered raceway 52 that is presented outwardly away from the axis X. In addition, the cone 44 has a thrust rib 54 at the large end of the raceway 52 and a retaining rib 56 at the small end. The thrust rib 54 has a rib face 58 along the larger end of the raceway 52 and a back face 60 presented in the opposite direction. Indeed, the cone 44 along its back face 60 abuts the back of the pinion 10 or else abuts a shim that is against the back of the pinion 10. In addition, the cone 44 at the base of its thrust rib 54 has an undercut 62 which separates the large end of the raceway 52 from the rib face 58. Generally speaking, the tapered raceway 52 lies within a conical envelope having its apex along the axis X. Actually, the raceway 52 is slightly crowned, and the conical envelope represents a mean which passes through the crowned raceway 52 (FIG. 3). The rib face 58 also lies within a conical envelope that has its apex along the axis X, but the apex angle for the rib face 58 is much greater than the apex angle for the raceway 52. The back face 60 lies in a plane that is perpendicular to the axis X.

The cup 46 has a tapered raceway 64 that extends between its ends and is presented inwardly toward the axis X and toward the raceway 52 of the cone 44. At the small end of its raceway 64 the cup 46 has a back face 66 that is against the shoulder at the end of the counterbore 30 in the housing 2. Generally speaking, the raceway 64 lies within a conical envelope that has its apex along the axis X. Indeed, the apecies for the envelopes of the two raceways 52 and 64 coincide along the axis X. Like the cone raceway 52, the cup raceway 64 is slightly crowned, so the envelope for that raceway actually represents a mean (FIG. 3). The cup raceway 64—or more accurately the envelope for the raceway 64—forms an angle θ with the axis X. The back face 66 of the cup 46 lies in a plane that is perpendicular to the axis X.

Figure 2:
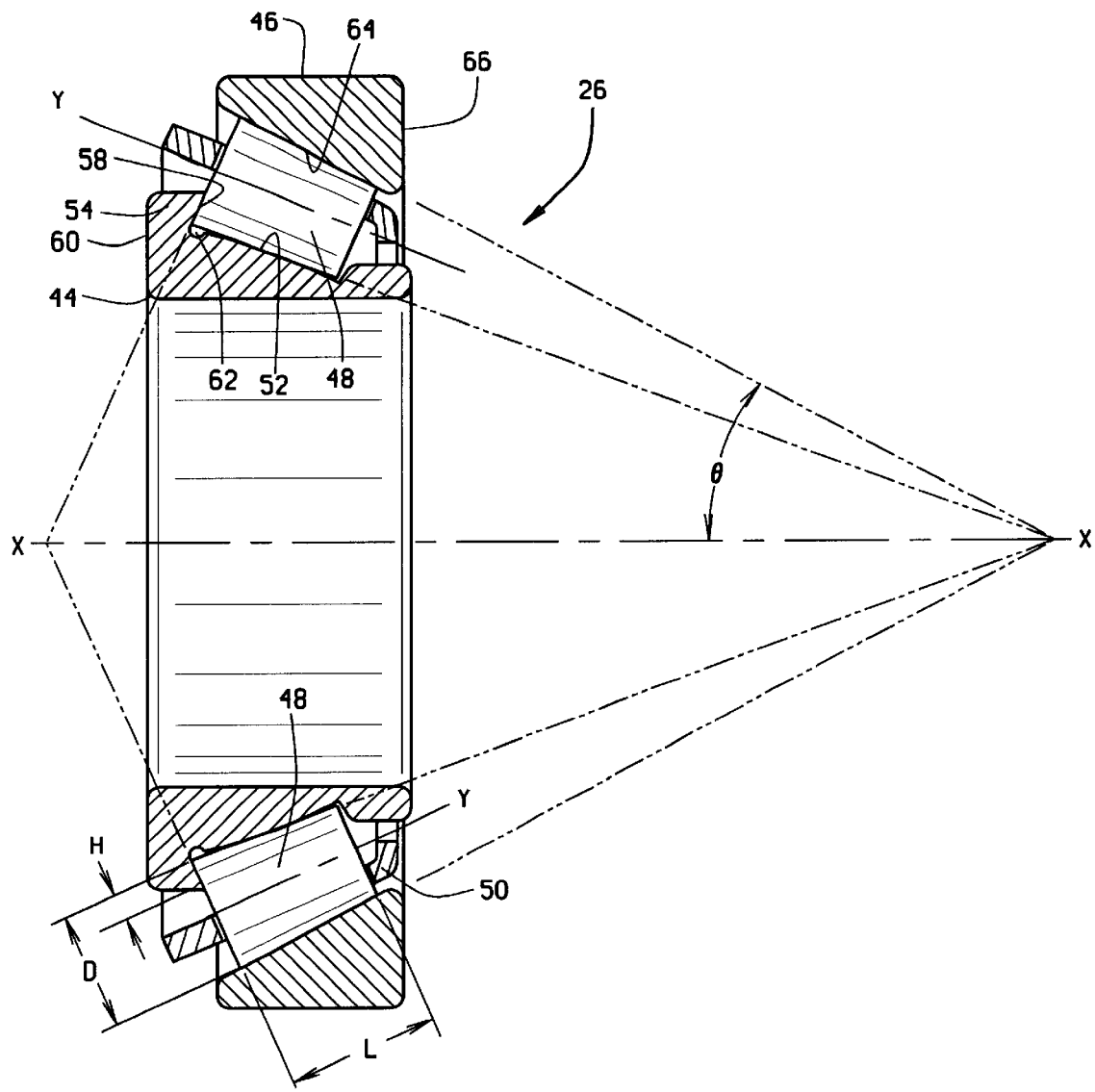
FIG. 2 is an enlarged sectional of the bearing in the head position.
Figure 3:
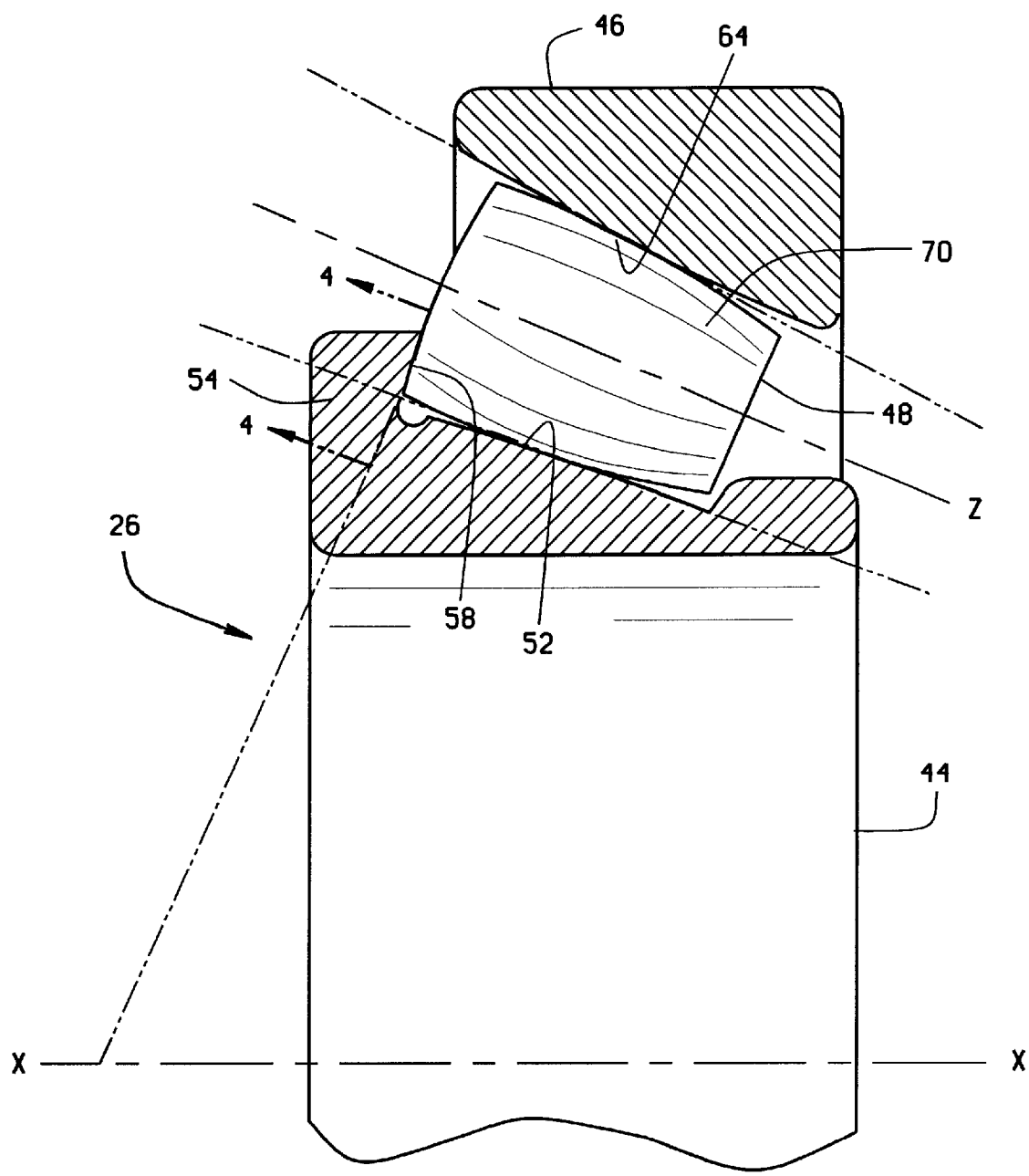
FIG. 3 is a sectional view of the bearing with its contacting surfaces exaggerated in contour.

The tapered rollers 48 are organized in a circular row between the cone 44 and the cup 46 (FIG. 2). Each roller 48 has a tapered side face 70 (FIG. 3) along which the roller 48 contacts the tapered raceways 52 and 64 of the cone 44 and cup 46, respectively, and a large diameter end face 72 along which the roller 48 contacts the rib face 58 on the thrust rib 54. The tapered side face 70 is crowned, but nevertheless the mean of the crowned surface establishes a conical envelope that has its apex along the axis X approximately at the location of the apecies for the envelopes formed by the raceways 52 and 64 (FIG. 3). This places rollers 48 on apex, so that when they roll along the raceways 52 and 64, rotating about their individual center axes Z as they do, pure rolling contact exists between the side faces 70 of the rollers 48 and the raceways 52 and 64, that is to say, rolling contact that is characterized by the absence of spinning. The large end face 72 of each roller 48 forms a segment of a sphere having its center along the axis Z of the roller 48.

The tail bearing 28 possesses the same components as the head bearing 26, although it need not be as large as the head being 26 since, being located remote from the pinion 10, it carries a lesser load. The cup 46 of the tail bearing 28 fits into the counterbore 30 of the housing 2 with an interference fit, its back face 66 being against the shoulder at the end of the counterbore 30 (FIG. 1). The cone 44 of the tail bearing 28 fits over the bearing seat 36 on the pinion shaft 4 with an interference it, and its back face 60 bears against the end of the universal joint 38. The nut 40, which attaches the universal joint 38 to the pinion shaft 4, controls the axial position of the joint 38 on the shaft 4, and that in turn controls the setting of the two bearings 26 and 28. The nut 40 is turned down until the bearings 26 and 28 are in preload. Thus, the bearings 26 and 28 operate without any axial or radial clearances.

The bearings 26 and 28 of course enable the pinion shaft 4 to rotate with minimum frictional resistance, all while maintaining the pinion 10, which is on the end of the shaft 4, in a fixed axial and radial position. The pinion 10, being engaged with the ring gear 12, rotates the ring gear 12, and the ring gear 12, in turn, rotates the axle shafts 6 to propel the vehicle. The two bearings 26 and 28 transfer to the housing 2 radial loads that are imparted to the pinion shaft, such as by the weight of the drive shaft connected to the universal joint 40. They also transfer axial loads. These loads develop primarily by reason of the spiral of the meshing teeth on the pinion 12 and ring gear 12. When the pinion 10 rotates in the direction which propels the vehicle forwardly, the meshing teeth urge the pinion toward the two bearings 26 and 28, but the head bearing 26 resists axial displacement of the pinion 10 and maintains the pinion 10 properly meshed with the ring gear 12. On the other hand, when the pinion 10 rotates in the opposite direction, the tail bearing 28 resists the tendency of the pinion to move farther into the housing 2.

The head bearing 26 in outward appearance somewhat resembles any single row tapered roller bearing of conventional design. But differences exist, and these differences enable the bearing 26 to operate with less torque and less wear. As a consequence, the bearing 26 consumes less power than a traditional single row tapered roller bearing of frequent size and has a greater lifespan.

To begin with, the angle θ of the tapered raceway 64 for the cup 46 is quite large (FIG. 2), ranging between 20° and 30°. The greater angle increases the effective bearing spread well beyond the geometrical spread of the bearings and beyond the effective spread of traditional bearings as well, and the increase in effective spread enhances the stability of the shaft 4. The greater angle of the cup raceway 64 positions the raceway 64 to better resist thrust exerted on the shaft 4, and the pinion 10, owing to the spiral of its teeth, exerts a thrust load on the shaft 4—a thrust load that is directed toward and resisted by the head bearing 26 when the vehicle is propelled forwardly. Whereas a lesser angle θ for a cup raceway translates a thrust load into high forces at the raceways, the greater angle θ for the cup raceway 64 reduces raceway forces. This in turn allows for shorter lines of contact between the side faces 70 of the rollers and the raceways 52 and 64 and less power loss. In this regard, the rollers 48 with their shorter lines of contact, disturb the hydrodynamic oil film less, and to disrupt or churn an oil film requires power. The reduced forces at the raceways 52 and 64 also reduce wear.

In addition, the bearing 26 has a low L/D ratio, that is to say the ratio between the length L of any roller 48 and the diameter D of the large end for that roller 48 (FIG. 2). In the typical head bearing the L/D ratio exceeds 2.0, whereas in the bearing 26 the L/D ratio ranges between 1.5 and 1.2. Again, with a shorter length, the rollers 48 impart less churning to the hydrodynamic oil film. The shorter length results in a greater diameter along the side face 70 of any roller 48, and that distributes the forces between the roller side faces 70 and raceways 52 and 64 over a greater area. In other words, it increases the width of the lines of contact between the rollers 48 and raceways 52 and 64, so that the contact stresses are less. The lesser L/D ratio also enables the bearing 26 to better reject debris particles.

In contrast to conventional bearings, the bearing 26 has the raceways 52 and 64 of its cone 42 and cup 44 highly profiled and the same holds true for the side faces 70 of its rollers 48 (FIG. 3). In short, the raceways 52 and 64 and the roller side faces 70 are crowned. To be sure, conventional tapered roller bearings have their raceways and roller side faces profiled to minimize stresses at the end of the rollers, but the profiling results in less than 40 μin. of relief per inch of contact length. In the bearing 26 the relief amounts to 700 μin. to 1500 μin. per inch of contact at both ends of each roller 48. This reduces the stiffness of the bearing 26 at light loads, but also causes the rollers 48 to plow or churn less of the oil film at light loads, because the rollers side faces 70 near their ends are separated from the raceways 52 and 64 sufficiently to avoid excessive churning of the hydrodynamic oil film and thus in those regions do not disrupt the film. However, heavier loads, which are normally transient, diminish the crowning and give the bearing 26 greater stability.

In further contrast to more traditional bearings, the bearing 26 on its cone 42 has a relatively high thrust rib 54 which provides the rib face 58 with greater surface area as it begins to wear than its counterparts in conventional bearings. In a conventional bearing the height of the rib is about 20% of the diameter of the large end of any roller. In the bearing 26, the height H (FIG. 2) of the rib 54 amounts to between 30% and 45% of the diameter D of the large end of any roller 48. The same holds true with regard to the rib face on the thrust rib 54—it amounts to about 30% to 45% of the diameter D for the large end of any roller 48. As a consequence of the larger surface area on the rib face 58, the end face 72 of any roller 48 contacts the rib face 58 over a greater surface area, and this reduces wear. Hence, the axial position of the pinion 10 will remain the same over a greater duration, and the pinion 10 will mesh properly with the ring gear 12 over a greater duration.

High asperities in contacting surfaces of a bearing penetrate the hydrodynamic oil film, so the surface finish should have a low average roughness, and this holds particularly true along the rib face 58 and the large end face 72 of the rollers 48 where the contact between those faces is characterized by sliding and spinning. When high asperities exist along the faces 58 and 72, metal-to-metal contact occurs which increases torque at low speed and produces high temperatures as well. In the bearing 26, the arithmetic average roughness of the rib face 58 and of the end face 72 on the rollers 48 is 4 μin. or less. This low surface roughness preserves the hydrodynamic oil film along the rib face and reduces torque.

Figure 4:
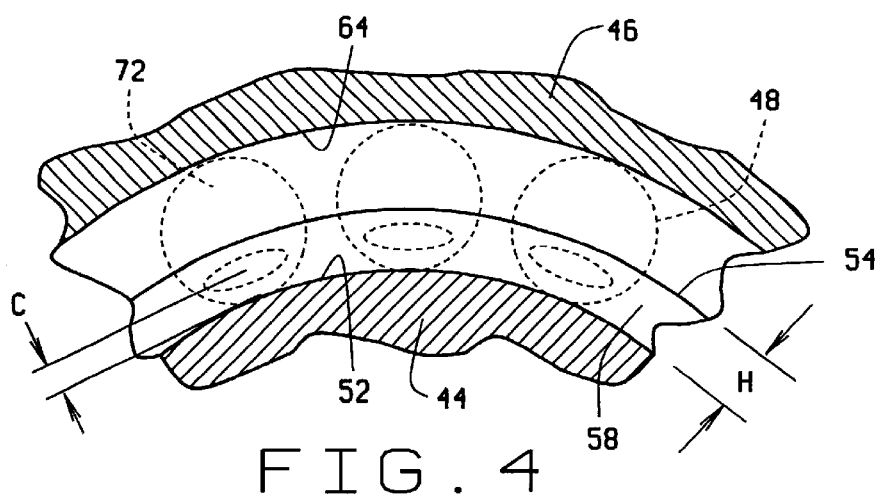
FIG. 4 is a fragmentary sectional view taken along line 4—4 of FIG. 3 and showing the rollers and areas of contact with the thrust rib face in phantom lines.

In order to best utilize the extra rib height and the increased surface area it provides, the radius of the sphere in which the large end surface 72 of any roller 48 lies should exceed 90% of the distance from that spherical surface to the apex formed by the envelope for the side face 70 on the roller 48, with the distance of course being measured along the roller axis Z. In the typical tapered roller bearing the large end face radius for any roller falls between 85% and 90% of the apex length. By increasing the radius of the large end face 72 or each roller 48, the area of contact between the large end face 72 and the conical rib face 58 increases, and this reduces torque at low speed and high temperature. The rollers 48 at their large end faces 72 contact the conical rib face 58 along somewhat elliptical regions, with the major axis of the ellipses extending circumferentially (FIG. 4).

By reducing runout in the large end face 72 of the rollers 48 the hydrodynamic oil film becomes more stable and less chance for metal-to-metal contact between the large end faces 72 and the rib face 58 exists. Runout in the end face 72 of any roller 48 produces wobble at that end face 72, and the high point can break through the oil film and bring end face 72 into contact with the rib face 58. The runout at the large end face 72 of a roller 48 should not exceed 50 μin.

Typically, the rollers for the head bearing on which a pinion shaft is supported contact the rib face about 0.04 in. 0.06 in. above the cone raceway and the rib face. This creates a relatively large moment arm between the elliptical region of contact and the cone raceway, and as the roller rolls along the cone raceway it must overcome the torque generated by the frictional force along the rib face acting through the relatively long moment arm. The torque consumes power that increases operating temperature. In the cone 42 of the bearing 26, the center of elliptical region of contact between the large end face 72 of any roller 48 and the conical rib face 58 lies a distance C between 0.02 in. and 0.04 in. radially beyond the intersection of the envelopes for the cone raceway 52 and the conical rib face 58 (FIG. 4). This reduces the torque required to rotate the rollers 48 against the friction along the rib face 58 and thus reduces the torque required to rotate the bearing 26.

Not only does the frictional contact between a roller and the rib face in a tapered roller bearing impose a torque on the roller, but it also tends to skew the roller between the raceways. Here another moment arm comes into consideration—the moment arm between the large end face of the roller and the centers of the region of contact between roller and the raceways along which it rolls. As a consequence of the moment, the roller is likely to pivot slightly about its center—or in other words skew, which tends to increase bearing torque. Typically the centers of contact between a slightly crowned roller and the slightly crowned raceways lie generally midway between the ends of the roller. In the bearing 26, the centers of contact between the side face 70 of any roller 48 and the raceways 52 and 64 are offset toward the large end face 72 of the roller 48. This produces a smaller moment arm and with it less tendency of the roller 48 to skew between the raceways 52 and 64. The center of contact is offset by an intentional misalignment of cone raceway to cup raceway. That misalignment should range between 0.0003 and 0.002 radians.

Preferably, the tail bearing 28 likewise has the foregoing characteristics, that is the characteristics which distinguish the head bearing 26 from conventional bearings.

In lieu of being on the cone 44 at the large end of the cone raceway 52, the thrust rib may be on the cup 46, or at least positioned against the cup 46 at the large end of the cup raceway 64.

What is claimed is:

1. A tapered roller bearing in a differential for a vehicle, for accommodating rotation about a bearing axis, said bearing comprising: an inner race having a tapered raceway that is presented outwardly away from the axis; an outer race surrounding the inner race and having a tapered raceway presented inwardly toward the axis and toward the raceway on the inner race, at an angle of 20° to 30° with respect to the axis; a thrust rib on one of the races and having a rib face located at the large end of the raceway for that race and presented at a substantial angle with respect to that raceway; and tapered rollers arranged in a circular row between the races, with each having a side face along which it contacts the tapered raceways of the inner and outer races and a large face along which it contacts the rib face of the thrust rib, wherein the rib face extends away from the envelope formed by the raceway at which it is located a distance greater than 30% of the diameter of the large ends of the rollers, and wherein the raceways and the side faces of the rollers are crowned to provide reliefs at both ends of the raceways, and the reliefs at at least one of the raceways are between 700 $\mu$in. and 1500 $\mu$in. per inch.

2. A bearing according to claim 1 wherein the side face of each roller lies generally within a conical envelope having its apex along the bearing axis, and the large end face lies in a spherical envelope having its center along the axis of the roller and a radius that is at least 90% of the distance between the apex of the roller envelope and spherical envelope of the large end face.

3. A bearing according to claim 1 wherein the rib face lies within a conical envelope having its apex on the bearing axis.

4. A bearing according to claim 3 wherein the large end face of each roller contacts the rib face along an area of contact, and the center of the area of contact is no greater than 0.04 inches from the envelope of the raceway that leads to the rib face.

5. A bearing according to claim 1 wherein the raceways or the side faces of the rollers or both are crowned; and wherein the centers of the regions of contact between the side faces of the rollers and raceways are offset toward the large end of the rollers.

6. A bearing according to claim 1 wherein the arithmetic mean roughness of the rib face and the large end faces of the rollers does not exceed 4 $\mu$in.

7. A bearing according to claim 1 wherein the runout of the large end face on each roller does not exceed 50 $\mu$in.

8. In a differential for a vehicle, with the differential including a housing, head and tail bearings in the housing where they define a bearing axis, a pinion shaft mounted in the bearings for rotation about the bearing axis, a pinion on the pinion shaft and within the housing, and a ring gear in the housing and meshing with the pinion, whereby rotation of the pinion shaft will rotate the ring gear, and wherein the head bearing comprises: a cone fitted to pinion shaft and having a tapered raceway that is presented away from the axis, and a thrust rib provided with a rib face located on the thrust rib at the large end of the raceway and oriented at a substantial angle with respect to the raceway; a cup having a tapered raceway that is presented inwardly toward the axis and the cone raceway at an angle of 20° to 30° with respect to the axis; and tapered rollers organized in a row between the cone and the cup and having tapered side faces along which the rollers contact the raceways and large end faces along which the rollers contact the rib face of the thrust rib; wherein the ratio between the roller length and the diameter of the roller at its large end does not exceed about 1.5; wherein the raceways and the side faces of the rollers are crowned to provide reliefs at both ends of the raceways, and the reliefs are between 700 $\mu$in. and 1500 $\mu$in per inch; the rib face lying within a conical envelope having its center at the axis; the side face of each roller lying in a conical envelope having its center along the axis; the large end face of each roller lying within a spherical envelope having its center along the axis of the roller and a radius greater than 90% of the distance between the apex for the envelope defined by the side face and the spherical envelope of the end face measured along the axis of the roller.

9. A differential according to claim 8 wherein the rib face extends away from the envelope formed by the cone raceway a distance greater than 30% of the diameter of the large ends of the rollers.

10. A differential according to claim 8 wherein the large end of each roller contacts the rib face along an area of contact, and the center of the area of contact is not more than 0.04 in. from the envelope of the cone raceway.

11. A bearing according to claim 8 wherein the raceways or the side faces of the rollers or both are crowned, and the centers of the regions of contact between the side faces of the rollers and the raceways are offset toward the large ends of the rollers.

12. A differential according to claim 11 wherein the sum of the misalignments between the side face of a roller and the cone raceway, on one hand, and the side face of that roller and the cup raceway, on the other, is between about 0.0003 and 0.002 radians.

13. A differential according to claim 12 wherein the tail bearing comprises the same elements that are in the head bearing; and wherein the bearings are mounted in opposition and set to a condition of preload.

14. A bearing according to claim 8 wherein the arithmetic mean roughness of the rib face and the large end faces of the rollers does not exceed 4 $\mu$in.

15. A bearing according to claim 8 wherein the runout of the large end face on each roller does not exceed 50 $\mu$in.

16. A tapered roller bearing in a differential for a vehicle, for accommodating rotation about a bearing axis, said bearing comprising: a cone having a tapered raceway that is presented outwardly from the axis and a thrust rib at the large end of the tapered raceway, the tapered raceway being crowned, yet generally lying in a conical envelope having its apex along the axis, the thrust rib having a rib face to which the tapered raceway leads, with the rib face being presented at a substantial angle with respect to the raceway; a cup surrounding the cone and having a tapered raceway that is presented inwardly toward the axis at an angle of 20° to 30° with respect to the axis, the cup raceway being crowned and generally lying in a conical envelope that has its apex along the axis at generally the same location as the apex for the envelope of the cone raceway; tapered rollers arranged in a circular row between the cone and cup with each having a roller axis and also tapered side face along which it contacts the raceways and a large end face along which it contacts the rib face, the side face being crowned and the large end face lying in a spherical envelope having its center along the roller axis, the crowning of the raceways and the side face of each roller being such that the centers of the regions of contact between the side face and the raceways are offset toward the rib face, wherein the sum of the misalignments between the side face of each roller and the cone raceway and the side face of that roller and the cup raceway is between about 0.0003 and 0.002 radians.

17. A bearing according to claim 16 wherein the rib face lies within a conical envelope having its apex along the bearing axis.

18. A bearing according to claim 16 wherein the ratio between the roller length and the diameter of the roller at its large end does not exceed about 1.5.

19. A bearing according to claim 16 wherein the raceways and the side faces of the rollers are crowned to provide reliefs at both ends of the raceways, and the reliefs are between 700 μin. and 1500 μin per inch.

20. A bearing according to claim 16 wherein the arithmetic mean roughness of the rib face and the large end faces of the rollers does not exceed 4 μin.

21. A bearing according to claim 16 wherein the rib face of the thrust rib extends away from the envelope formed by the raceway at which it is located a distance greater than 30% of the diameter of the large ends of the rollers.

22. A bearing according to claim 16 wherein the large end face of each roller contacts the rib face along an area of contact, and the center of the area of contact is no greater than 0.04 inches from the envelope of the raceway that leads to the rib face.

23. A bearing according to claim 16 wherein the runout of the large end face on each roller does not exceed 50 μin.

24. A bearing according to claim 16 wherein the side face of each roller lies generally within a conical envelope having its apex along the bearing axis, and the large end face lies in a spherical envelope having a radius that is at least 90% of the distance between the apex of the roller envelope and spherical envelope of the large end face.

* * * * *